United States Patent
Ledger et al.

(10) Patent No.: US 10,654,128 B2
(45) Date of Patent: May 19, 2020

(54) METHOD AND LASER DEVICE FOR FORMING GROOVES IN BEARING SURFACES, AND BEARINGS INCLUDING SUCH GROOVES

(71) Applicant: BorgWarner Inc., Auburn Hills, MI (US)

(72) Inventors: David Ledger, Asheville, NC (US); Zachary Ashton, Arden, NC (US)

(73) Assignee: BorgWarner, Inc., Auburn Hills, MI (US)

( * ) Notice: Subject to any disclaimer, the term of this patent is extended or adjusted under 35 U.S.C. 154(b) by 51 days.

(21) Appl. No.: 15/301,433

(22) PCT Filed: Mar. 25, 2015

(86) PCT No.: PCT/US2015/022356
§ 371 (c)(1),
(2) Date: Oct. 3, 2016

(87) PCT Pub. No.: WO2015/153206
PCT Pub. Date: Oct. 8, 2015

(65) Prior Publication Data
US 2017/0028509 A1    Feb. 2, 2017

Related U.S. Application Data

(60) Provisional application No. 61/975,043, filed on Apr. 4, 2014.

(51) Int. Cl.
*B23K 26/10*    (2006.01)
*B23K 26/36*    (2014.01)
(Continued)

(52) U.S. Cl.
CPC .......... *B23K 26/106* (2013.01); *B23K 26/062* (2015.10); *B23K 26/0823* (2013.01);
(Continued)

(58) Field of Classification Search
CPC .. B23K 26/106; B23K 26/702; B23K 26/142; B23K 26/364; B23K 26/362;
(Continued)

(56) References Cited

U.S. PATENT DOCUMENTS 3,549,733 A * 12/1970 Caddell ..................... B41C 1/05
101/401.1
3,772,496 A * 11/1973 Harendza-Harinxma ...................
B23K 26/12
219/121.69
(Continued)

FOREIGN PATENT DOCUMENTS

DE    3029104 A1 *  2/1982  ............. B23K 26/02
FR    2762244 A1 * 10/1998
(Continued)

OTHER PUBLICATIONS

Machine translation of Japan Patent document No. 6-315,784, Jul. 2018.*
(Continued)

*Primary Examiner* — Geoffrey S Evans
(74) *Attorney, Agent, or Firm* — Young Basile Hanlon & MacFarlane, P.C.

(57) ABSTRACT

A laser cutting device (100) is configured to etch an inner surface of a journal bearing (18). The laser cutting device (100) includes a laser (102); a beam directing tool (130) that receives a beam (108) emitted from the laser (102) and selectively changes the direction of travel of the beam (108); a fixture (170) that supports the journal bearing (18) in a desired position relative to the beam directing tool (130); an actuator (148) connected to one of the beam directing tool (130) and the fixture (170), the actuator (148) providing relative movement between the beam directing tool (130) and the fixture (170); and a controller (180) that controls the intensity and duration of the beam (108) emitted from the (Continued)

laser (102); and the actuator (148), whereby material can be removed from a surface of the journal bearing (18) to a precise width and depth, and in any pattern.

10 Claims, 11 Drawing Sheets (51) Int. Cl.
| | |
|---|---|
| *B23K 26/082* | (2014.01) |
| *B23K 26/364* | (2014.01) |
| *B23K 26/08* | (2014.01) |
| *B23K 26/062* | (2014.01) |
| *B23K 26/38* | (2014.01) |
| *B23K 26/70* | (2014.01) |
| *B23K 26/142* | (2014.01) |
| *B23K 26/16* | (2006.01) |
| *F01D 25/04* | (2006.01) |
| *F01D 25/16* | (2006.01) |
| *F01D 25/18* | (2006.01) |
| *F02B 39/14* | (2006.01) |
| *F16C 32/06* | (2006.01) |
| *B23K 101/00* | (2006.01) |

(52) U.S. Cl.
CPC ............ *B23K 26/142* (2015.10); *B23K 26/16* (2013.01); *B23K 26/364* (2015.10); *B23K 26/38* (2013.01); *B23K 26/702* (2015.10); *F01D 25/04* (2013.01); *F01D 25/166* (2013.01); *F01D 25/18* (2013.01); *F02B 39/14* (2013.01); *F16C 32/0633* (2013.01); *F16C 32/0666* (2013.01); *B23K 2101/001* (2018.08); *B23K 2101/006* (2018.08); *F05D 2240/53* (2013.01); *F05D 2260/98* (2013.01); *F16C 2360/00* (2013.01); *G05B 2219/45041* (2013.01)

(58) Field of Classification Search
CPC .. B23K 26/16; B23K 26/0823; B23K 26/062; B23K 26/0643; B23K 26/0689; G05B 2219/45041
See application file for complete search history.

(56) References Cited

U.S. PATENT DOCUMENTS

| | | | | | |
|---|---|---|---|---|---|
| 4,017,708 | A | * | 4/1977 | Engel | ................... B23K 26/073 |
| | | | | | 148/565 |
| 4,044,936 | A | * | 8/1977 | Obersby | ............. C03B 33/0955 |
| | | | | | 219/121.6 |
| 5,009,522 | A | | 4/1991 | Hahn | |
| 5,456,535 | A | | 10/1995 | Chen et al. | |
| 5,611,949 | A | * | 3/1997 | Snellman | ........... B23K 26/0838 |
| | | | | | 219/121.67 |
| 5,624,585 | A | * | 4/1997 | Haruta | ................. B23K 26/073 |
| | | | | | 219/121.63 |
| 5,719,373 | A | | 2/1998 | Snyder et al. | |
| 5,855,802 | A | * | 1/1999 | Acciai | ....................... A61F 2/91 |
| | | | | | 216/48 |
| 5,910,260 | A | | 6/1999 | Gerber | |
| 5,994,667 | A | * | 11/1999 | Merdan | .................. B23K 26/18 |
| | | | | | 219/121.67 |
| 6,241,394 | B1 | | 6/2001 | Kallenberger et al. | |
| 6,437,285 | B1 | * | 8/2002 | Thomas | ................ B08B 7/0042 |
| | | | | | 219/121.68 |
| 8,075,191 | B2 | | 12/2011 | Gutknecht | |
| 2002/0125232 | A1 | * | 9/2002 | Choo | .................... B23K 26/046 |
| | | | | | 219/121.69 |
| 2005/0103763 | A1 | * | 5/2005 | Momose | ............ B23K 26/0643 |
| | | | | | 219/121.69 |
| 2007/0056939 | A1 | * | 3/2007 | Colby | ................ B23K 26/0823 |
| | | | | | 219/121.63 |
| 2010/0193482 | A1 | * | 8/2010 | Ow | ........................ B23K 26/38 |
| | | | | | 219/121.67 |
| 2011/0253245 | A1 | * | 10/2011 | Boltshauser | ............ B21C 37/08 |
| | | | | | 138/177 |
| 2011/0297083 | A1 | * | 12/2011 | Bartels | ................... B23K 26/02 |
| | | | | | 118/666 |

FOREIGN PATENT DOCUMENTS

| | | | | |
|---|---|---|---|---|
| JP | 61-063387 | A | * | 4/1986 |
| JP | 62-279096 | A | * | 12/1987 |
| JP | S62279096 | A | | 12/1987 |
| JP | S6353218 | A | | 3/1988 |
| JP | 06-315784 | A | * | 11/1994 |

OTHER PUBLICATIONS

Machine translation of France Patent document No. 2,762,244, Jul. 2018.*
Machine translation of Japan Patent No. 61-063,387, May 2019.*
Machine translation of DE3029104A1, Jun. 2019.*
International Search Report and Written Opinion; dated Jul. 2, 2015; for International Application No. PCT/US2015/022356 13 pages.

* cited by examiner

METHOD AND LASER DEVICE FOR FORMING GROOVES IN BEARING SURFACES, AND BEARINGS INCLUDING SUCH GROOVES

CROSS-REFERENCE TO RELATED APPLICATIONS

This application claims the benefit of PCT Application Serial No. US2015/022356 filed Mar. 25, 2015 and U.S. Provisional Application Ser. No. 61/975,043 filed Apr. 4, 2014.

FIELD OF THE INVENTION

The invention relates to a turbocharger with an improved bearing assembly and to a laser device and method for forming grooves on an inner surface of a journal bearing.

BACKGROUND

An exhaust gas turbocharger is a type of forced induction system in which engine exhaust gases drive a turbine wheel. The turbine wheel is connected via a shaft to a compressor impeller. Ambient air is compressed by the compressor impeller and is fed into the intake manifold of the engine, allowing the engine to combust more fuel, and thus to produce more power for a given displacement. Considering the volumetric gas intake requirements of an engine operating at peak performance and the comparatively small size of a turbocharger, it can be appreciated that a turbocharger may be expected to rotate at speeds of up to 300,000 rpm and higher. In addition, the engine exhaust gas that drives the turbine wheel may have a temperature as high as 1,300 F. Thus, turbochargers generally operate at extremely high rotational speeds, and under conditions of high temperature and varying load.

The shaft is supported by a bearing system that includes a single or two spaced-apart journal bearings, which function to stabilize the shaft and dampen oscillations. The bearing system is cooled using a lubrication system in which oil is channeled through the bearing system for removal of heat. The oil flow behavior between the shaft and the inner diameter of the journal bearing can influence the rotordynamics of shaft motion and transmitted vibrations.

SUMMARY

In some aspects, a laser cutting device is configured to etch a surface of a work product. The laser cutting device includes a laser; a beam directing tool that is configured to be inserted inside the work product and to receive a beam of electromagnetic radiation emitted from the laser and selectively change the direction of travel of the beam; a fixture configured to support the work product in a desired position relative to the beam directing tool; an actuator connected to one of the beam directing tool and the fixture, the actuator configured to provide relative movement between the beam directing tool and the fixture; and a controller. The controller is configured to control the actuator and the intensity and duration of the beam output from the laser.

The laser cutting device may include one or more of the following features: The beam directing tool includes a tube having a first end, a second end opposed to the first end, and a tube longitudinal axis. The beam direct tool includes a mirror supported on the tube such that the mirror is at an angle to the tube longitudinal axis. The beam directing tool includes an opening disposed between the first end and the second end, and the mirror is fixed within the tube at an axial location corresponding to the opening. The beam directing tool includes a drive shaft disposed within the tube and extending in parallel with the tube longitudinal axis; and a gear set that connects the mirror to the drive shaft and is configured to transmit rotation of the drive shaft into a rotation of the mirror. The mirror is rotatably supported on the second end of the tube via a pin. The device includes a vacuum source and a vacuum line extending between the vacuum source and the work product, the vacuum source and the vacuum line configured to remove cutting byproducts from the work product. The device includes a cooling fluid source and a fluid line extending between the cooling fluid source and the work product, the cooling fluid source and the fluid line configured to provide a cooling fluid to the work product. The position of the fixture is fixed, and the beam directing tool is connected to the actuator, which is configured to vary the position of the beam directing tool relative to the fixture. The position of the beam directing tool is fixed, and the fixture is connected to the actuator, which is configured to vary the position of the fixture relative to the beam directing tool.

In some aspects, a journal bearing includes a first end, a second end opposed to the first end, a longitudinal axis that extends between the first end and the second end, and a semi-continuous groove pattern formed on an inner surface of the bearing that is configured to disturb formation of oil whirl.

The journal bearing may include one or more of the following features: The semi-continuous groove pattern comprises chevron-shaped recesses. The recesses are arranged along a line. The line is angled relative to the longitudinal axis. The chevron-shaped recesses are oriented such that an apex of each recess points circumferentially in the direction of bearing rotation. The recesses are arranged along multiple lines that are angled relative to the longitudinal axis, where the lines intersect at a location corresponding a radially-extending lubrication bore.

Subsynchronous vibrations are vibrations having a frequency that is lower than the rotational frequency of the shaft. Subsynchronous vibrations can be generated in the bearing system of a turbocharger during various operating conditions, including but not limited to cold starts and light to moderate accelerations. When they occur, subsynchronous vibrations can transmit unwanted noise into a vehicle. To address such vibrations, some turbocharger journal bearings include a groove that is formed along an inner surface thereof to alter oil whirl, and thus reduce subsynchronous vibration. Due to the relatively small size of some journal bearings, and the location of the groove (e.g., on the bearing inner surface), conventional methods of groove formation such as machining permit limited groove configurations. By using a laser cutting device and method to form one or more grooves on an inner surface of the journal bearings, the groove can be formed having any width, depth and/or pattern, permitting optimization of bearing design and improved vibration reduction.

By providing a pattern of grooves on the journal bearing inner surface, the oil whirl frequency can be changed by the depth and size of the groove pattern. Advantageously, the onset of subsynchronous vibration can be avoided by designing some eccentricity into the rotor system during operation. In addition, the amount of oil cooling and the flow rate of oil can be varied by the sizing of the grooves depending on the thermal requirements of the bearing system.

DETAILED DESCRIPTION

Figure 1:
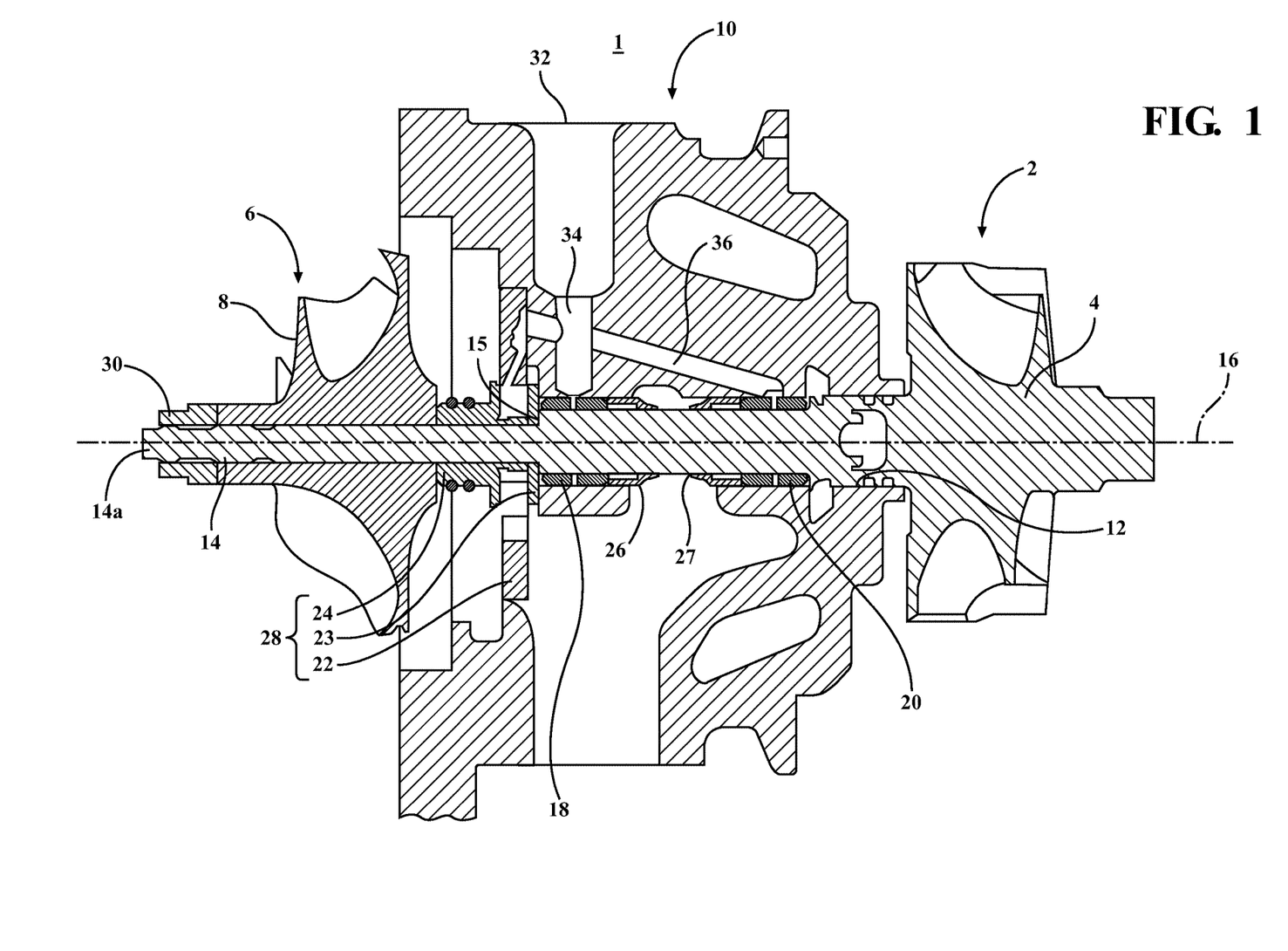
FIG. 1 is a cross-sectional view of an exhaust gas turbocharger including journal bearings.

Referring to FIG. 1, an exhaust gas turbocharger 1 includes a turbine section 2, a compressor section 6, and a center bearing housing 10 disposed between, and connecting, the compressor section 6 to the turbine section 2. The turbine section 2 includes a turbine housing (not shown) and a turbine wheel 4 disposed in the turbine housing. The compressor section 6 includes a compressor housing (not shown) and a compressor impeller 8 disposed in the compressor housing. The turbine wheel 4 is connected to the compressor impeller 8 via a shaft 14.

The shaft 14 is supported for rotation about a rotational axis 16 within in the bearing housing 10 via a pair of axially spaced journal bearings 18, 20. For example, a compressor-side journal bearing 18 supports the shaft 14 adjacent the compressor section 6, and a turbine-side journal bearing 20 supports the shaft 14 adjacent to the turbine section 2. The journal bearings 18, 20 are semi-floating ring bearings which employ an inner oil film and an outer oil film to reduce noise (i.e., unbalance moan/whine and constant tone induced by rotor unbalance and inner oil whirl or whip in the bearing) and rotor amplitude at resonant frequencies. The inner oil film functions to carry the rotor against the external forces acting on the rotor, whereas the outer oil film, which is thick relative to the inner oil film, provides the rotor with a large damping coefficient to reduce rotor deflection at resonances and suppress noise.

The axial spacing between the compressor-side journal bearing 18 and the turbine-side journal bearing 20 is maintained by cylindrical a journal bearing spacer 26. In addition, a thrust bearing assembly 28 is disposed in the bearing housing 10 so as to provide axial support for the shaft 14. The shaft 14 is reduced in diameter on the compressor side of the compressor-side journal bearing 18, and a shoulder 15 is formed at the transition between diameters. The compressor impeller 8 and the thrust bearing assembly 28, including a thrust bearing 22, a thrust washer assembly 23, and an oil flinger 24, are all supported on the shaft 14 in the reduced diameter portion. The terminal end 14a of the shaft 14 extends axially beyond the compressor impeller 8 and includes an external thread. A nut 30 engages the thread, and is tightened sufficiently to clamp the compressor impeller 8 and the thrust bearing assembly 28 against the shoulder 15.

In use, the turbine wheel 4 in the turbine housing is rotatably driven by an inflow of exhaust gas supplied from the exhaust manifold of an engine. Since the shaft 14 connects the turbine wheel 4 to the compressor impeller 8 in the compressor housing, the rotation of the turbine wheel 4 causes rotation of the compressor impeller 8. As the compressor impeller 8 rotates, it increases the air mass flow rate, airflow density and air pressure delivered to the engine's cylinders via an outflow from the compressor section 6, which is connected to the engine's air intake manifold (not shown).

The turbocharger bearing system is lubricated by oil from the engine. The oil is fed under pressure into the bearing housing 10 via an oil supply port 32 to lubricate the bearing surfaces within and about the journal bearings 18, 20. More specifically, oil passes through individual bearing supply channels 34 and 36 for lubricating the journal bearings 18, 20. The supply channels 34 and 36 open at generally axially centered positions with respect to the two journal bearings 18, 20 such that oil flow may occur in both directions axially to lubricate the bearing surfaces. The journal bearings 18, 20 have axially centered lubricating oil flow bores 60 that receive oil from the respective supply channels 34, 36. Oil flowing over and through the journal bearings 18, 20 is eventually collected within a bearing housing sump chamber 38 for return circulation through an outlet port 40.

A bearing spacer 26 is disposed between the journal bearings 18, 20 for precise axial location and retention of the journal bearings 18, 20 within the bore 12. The outer diameter of the spacer 26 is formed having an outer diameter that is less than the outer diameters of the journal bearings 18, 20. Similarly, the inner diameter of the bearing spacer 26 is formed having a diameter that is larger than the inner diameter of the journal bearings 18, 20. Furthermore, the spacer 26 has large central opening 27 that permits lubricating oil flow therethrough.

Figure 2:
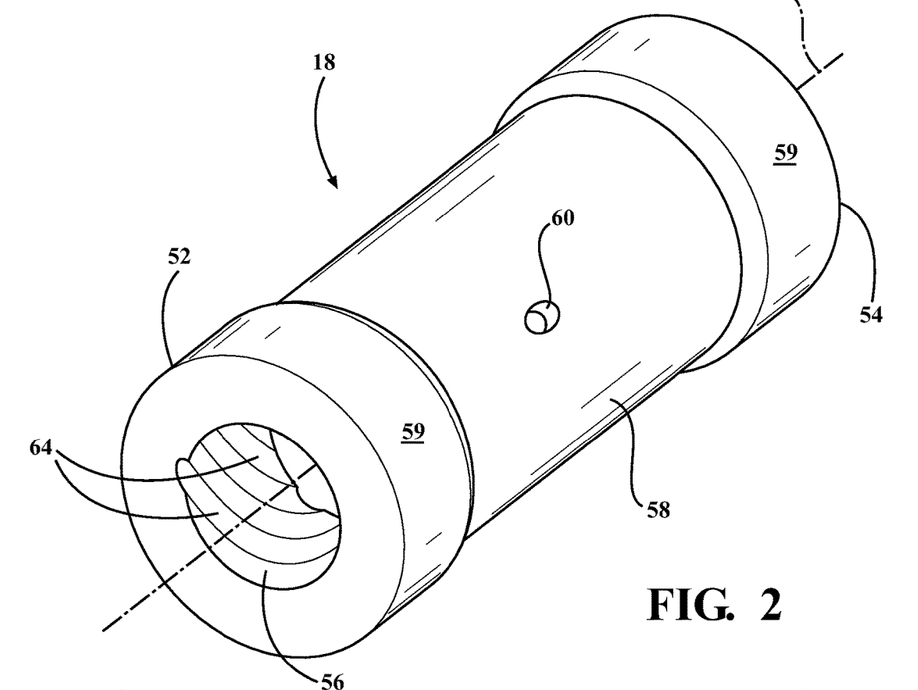
FIG. 2 is a perspective view of a journal bearing including grooves formed on an inner surface.
Figure 3:
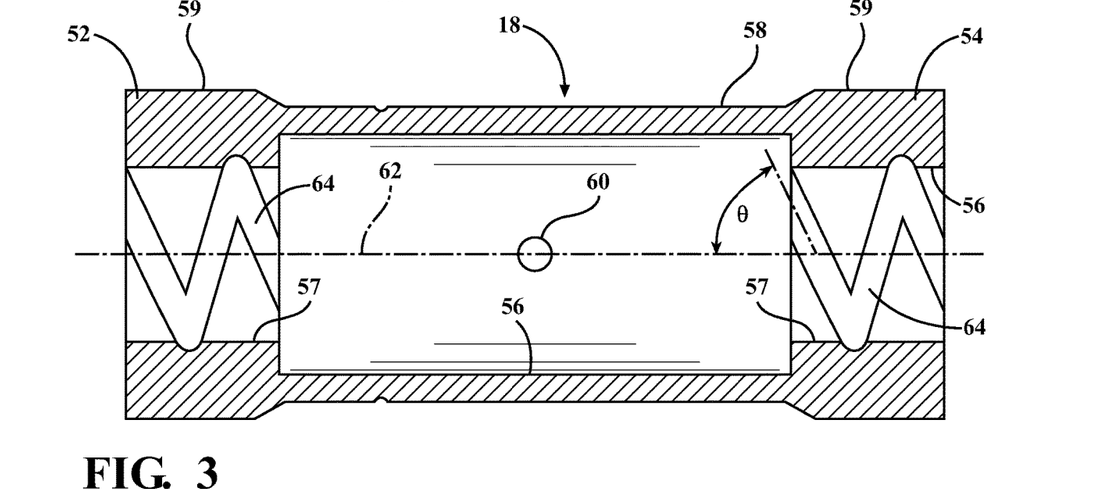
FIG. 3 is a side sectional view of a journal bearing including a helical groove formed on an inner surface.
Figure 4:
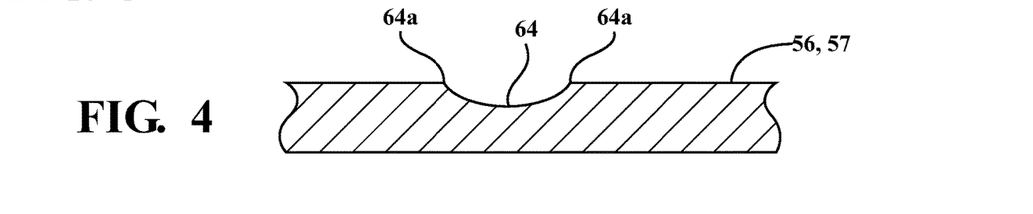
FIG. 4 is a side sectional view of a portion of a journal bearing wall illustrating a shape of the groove of FIG. 3.

Referring to FIGS. 2-4, the journal bearings 18, 20 are substantially structurally similar, whereby only the compressor-side journal bearing 18 will be described in detail. The journal bearing 18 is generally in the form of a hollow cylinder having a first end 52, and a second end 54 opposed to the first end 52. A longitudinal axis 62 extends between the first end 52 and the second end 54. The axially-centered oil flow bore 60 is a radially-extending through opening that permits lubricating oil to flow from an outer surface 58 to an inner surface 56. Adjacent each respective axial end 52, 54, the inner surface 56 defines an inner bearing portion 57 that is shaped and dimensioned to fit with relatively close clearance about the shaft 14 with sufficient gap for the inner oil film. Likewise, adjacent each respective axial end 52, 54, the outer surface 58 defines an outer bearing portion 59 that is shaped and dimensioned to fit with relatively close clearance within a bore 12 formed in the center bearing housing 10, with sufficient gap for the outer oil film. The journal bearing 18 can be formed by various manufacturing techniques utilizing a variety of known bearing materials, such as leaded or unleaded bronze, aluminum, etc.

The inner bearing portion 57 of the journal bearing 18 includes at least one groove 64 that extends between the first end 52 and the second end 54 along a helical path that is arranged at a helix angle $\theta_1$ relative to the bearing longitudinal axis 62. The helix angle $\theta_1$ may be selected from any angle, and will be determined based on the requirements of the specific application. The groove width and depth will also be determined based on the requirements of the specific application. In addition, the groove edges 64a, 64a, may be rounded or smoothed (FIG. 4) to reduce turbulence in the vicinity of the groove 64. The helical groove serves to alter oil whirl, whereby subsynchronous shaft motion and resulting vibration of the bearing is reduces, and thus noise is reduced.

Figure 5:
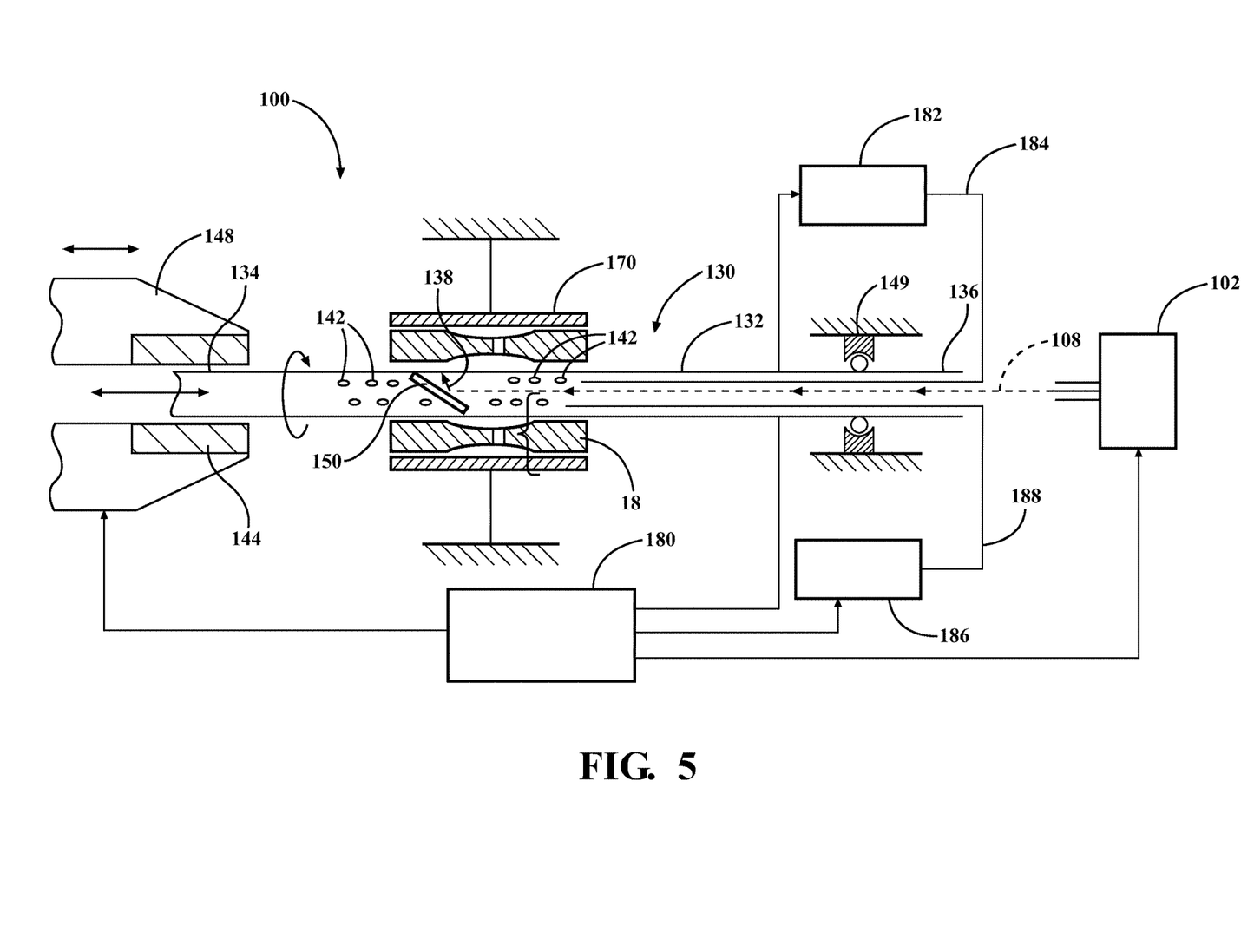
FIG. 5 is a schematic view of a laser cutting device.

Referring to FIG. 5, the groove 64 is cut in the inner bearing portion 57 of the inner surface 56 using a laser cutting device 100 that includes a laser 102 and a beam directing tool 130. Laser cutting using the laser cutting device 100 is advantageous since precise and accurate groove patterns can be formed on the interior surface 56 of the relatively small diameter bearing 18.

The type of laser used for cutting will depend on the specific application. For example, the laser 102 may be a carbon dioxide laser ($CO_2$) or neodymium-doped yttrium-aluminum-garnet (Nd:YAG) laser. The Nd:YAG laser uses a solid crystal substance to focus light onto its target. It can fire a continuous or rhythmic infrared beam that can be enhanced by secondary equipment, like optical pumping lamps or diodes. The $CO_2$ laser is a more powerful alternative to the Nd:YAG type, and uses a gas medium instead of a crystal for focusing light. As its name suggests, the laser's gas discharge consists of a large portion of carbon dioxide mixed with smaller amounts of nitrogen, helium, and hydrogen. Due to its cutting strength, the $CO_2$ laser is capable of shaping bulky steel plates up to 25 millimeters thick, as well as cutting or engraving thinner materials at lower power.

The beam directing tool 130 is dimensioned to fit within the interior space of the bearing 18. The beam directing tool 130 includes an elongate tube 132, and a mirror 150 mounted within the tube 132. The tube 132 includes a first end 134, a second end 136 that is opposed to the first end 134, and a longitudinal axis 140 that extends between the first end 134 and the second end 136. The tube 132 includes an opening 138 disposed between the first and second ends 134, 136. The mirror 150 is fixed within the tube at an axial position corresponding to the location of the opening 138, and is oriented at a 45 degree angle relative to the tube longitudinal axis 140 with the reflective surface facing the opening 138. The tube first end 134 is connected to an actuator 148 via, for example, a chuck 144. The actuator 148 is configured to rotate the tube 132 about the tube longitudinal axis 140, and translate the tube 132 along the tube longitudinal axis 140 in both directions. A precision bearing 149 supports the tube second end 136.

In use, the bearing 18 is mounted in a fixture 170 that holds the bearing 18 such that the position of the bearing 18 is fixed relative to the laser 102, and such that the bearing longitudinal axis 62 is aligned with the beam 108 output from the laser 102. In addition, the beam directing tool 130 is inserted into the bearing 18 such that the tube 132 is positioned within the bearing 18 so that the tube longitudinal axis 140 is coaxial with the bearing longitudinal axis 62. In addition, the opening 138 is positioned facing the inner bearing portion 57 of the bearing inner surface 56. By this configuration, the mirror 150 lies in the path of the laser beam 108. The mirror 150 redirects the laser beam toward the inner bearing portion 57, whereby grooves (i.e., grooves 64) can be formed in the inner bearing portion 57. The position of the tube 132, and thus the mirror 150, is controlled by the actuator 148. A controller 180 is used to coordinate the output of the laser 102 (e.g., power and duration) and the actuator 148, whereby material can be removed from the bearing inner surface 56 (particularly, the inner bearing portion 57) to a precise width and depth, and in any pattern, including, but not limited to, the helical groove 64 described above with respect to FIGS. 2-4.

The laser cutting device 100 further includes a vacuum source 182 and a vacuum line 184 that extends from the vacuum source 182 to the vicinity of the cutting operation. For example, the line 184 may open within the bearing 18 to remove the vaporized material during cutting, and prevent the vaporized material from coating the bearing surfaces 56, 57, 58, 59. In the illustrated embodiment, the vacuum line 184 extends within the tube 132 to the vicinity of the opening 138, and the tube sidewall adjacent the opening 138 includes one or more perforations 142 that permit the vapors to pass into the interior space of the tube 132 and be withdrawn from the bearing 18 via the vacuum line 184.

In some embodiments, the laser cutting device 100 may also include a cooling gas source 186 (i.e., air or inert gas), and a gas supply line 188 that extends within the tube 132 to the vicinity of the opening 138. In addition, the perforations 142 in the tube distal end 136 permit a flow of gas through the tube sidewall toward the bearing inner surface 56, whereby the surface 56 can be cooled.

Figure 6:
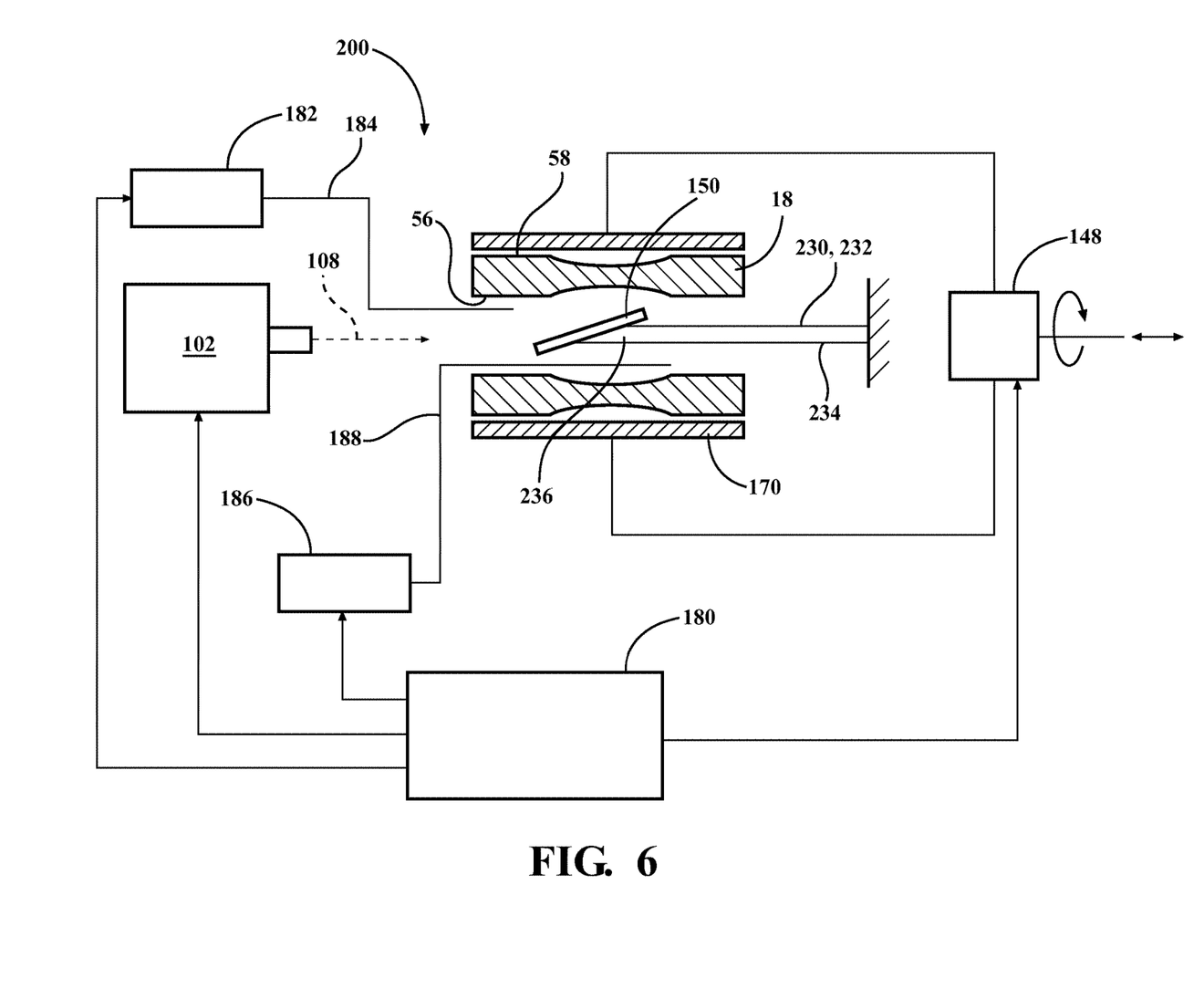
FIG. 6 is a schematic view of an alternative laser cutting device.

Referring to FIG. 6, an alternative laser cutting device 200 includes all the components of the laser cutting device 100 described above, in a slightly different configuration. For example, in the laser cutting device 200, the position of the tube 132, and thus the mirror 150, is fixed relative to the laser 102, and the fixture 170, which supports the bearing 18, is connected to the actuator 148. The actuator 148 is configured to rotate the fixture 170 about the tube longitudinal axis 140, and translate the fixture 170 along the tube longitudinal axis 140 in both directions. The controller 180 coordinates the output of the laser 102 (e.g., power and duration) and the actuator 148, whereby material can be removed from the inner bearing portion 57 of the bearing surface in a desired pattern.

The laser cutting device 200 includes a slightly modified beam directing tool 230. The beam directing tool 230 is dimensioned to fit within the interior space of the bearing 18. The beam directing tool 230 includes an elongate tube 232, and the mirror 150 mounted within the tube 132. The tube 232 includes a first end 234 that is fixed relative to the laser 102, a second end 236 that is opposed to the first end 234, and a longitudinal axis 240 that extends between the first end 234 and the second end 236. The mirror 150 is fixed to the tube second end 236, and is oriented at a 45 degree angle relative to the tube longitudinal axis 240.

In this embodiment, the vacuum line 184 and the gas supply line 188 are external to the beam directing tool 230.

Figure 7:
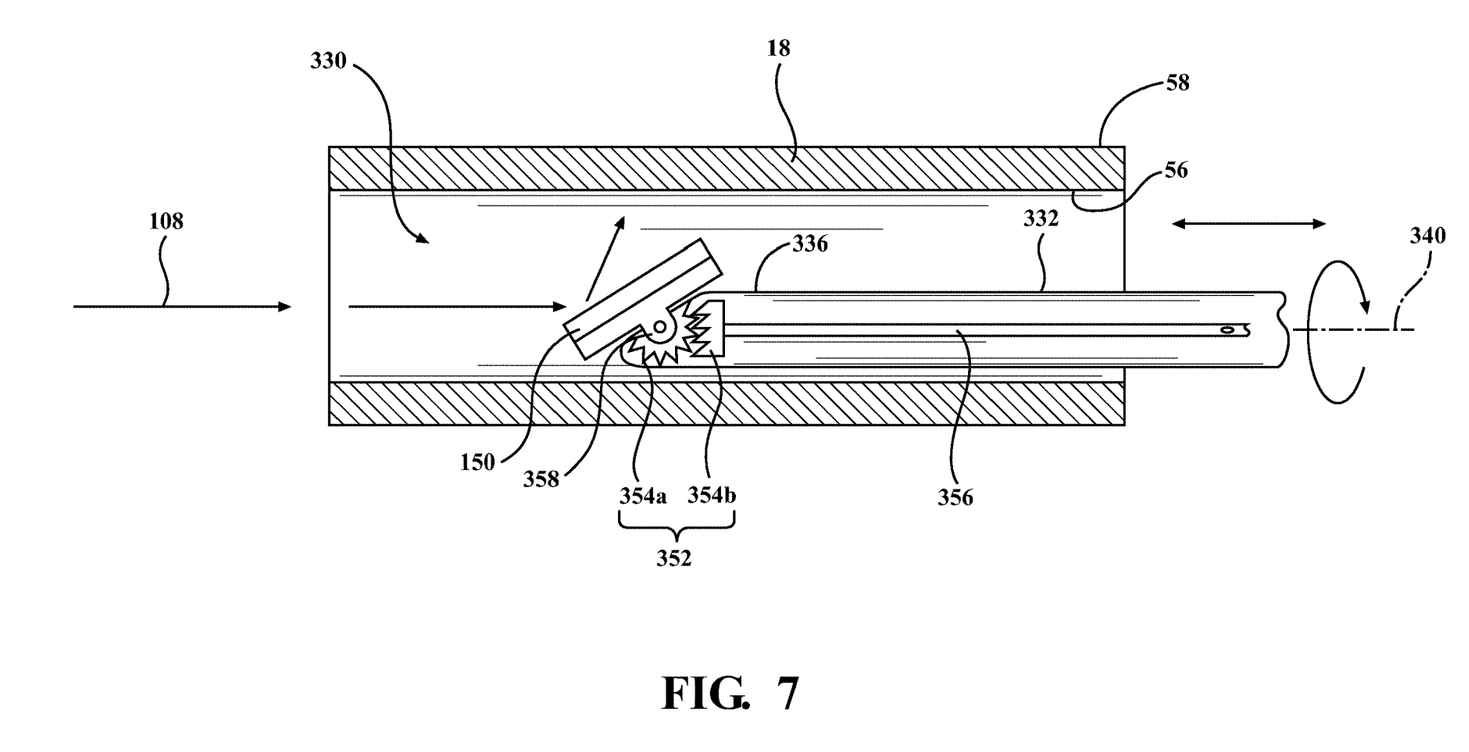
FIG. 7 is a cross-sectional view of an alternative beam directing tool.

Referring to FIG. 7, another modified beam directing tool 330 is dimensioned to fit within the interior space of the bearing 18, and can be used in the earlier-described laser cutting device 100. The beam directing tool 330 includes an elongate tube 332. The tube 332 includes a first end 334 that is supported by the actuator 148 (not shown in FIG. 7), a second end 336 that is opposed to the first end 334, and a longitudinal axis 340 that extends between the first end 334 and the second end 336. The mirror 150 is rotatably supported on the tube second end 336 via a pivot pin 358 such that the angle of the mirror 150 relative to the tube longitudinal axis 340 can be varied. In addition, the beam directing tool 330 includes a drive shaft 356 rotatably supported inside the tube 332 and extending in parallel with the tube longitudinal axis 340, and a gear set 352 that connects the drive shaft 356 to the mirror 150. The gear set 352 may include a pair of bevel gears 354a, 354b that transmit the rotational motion of the drive shaft 356 to a rotational motion of the mirror 150 about the pin 358, which is oriented transverse to the tube longitudinal axis 340. The actuator 148 is configured to rotate the drive shaft 356 about the tube longitudinal axis 340, and translate the tube 332 along the tube longitudinal axis 340 in both directions. The controller 180 coordinates the output of the laser 102 (e.g., power and duration) and the actuator 148, whereby material can be removed from the inner bearing portion 57 of the bearing inner surface 56 in a desired pattern.

As previously discussed, the laser cutting device 100, 200 can be used to remove material from the bearing inner surface 56 to a precise width and depth, and in any pattern, including, but not limited to, the helical groove 64 described above with respect to FIGS. 2-4. Several additional exemplary groove patterns will now be described.

Figure 8:
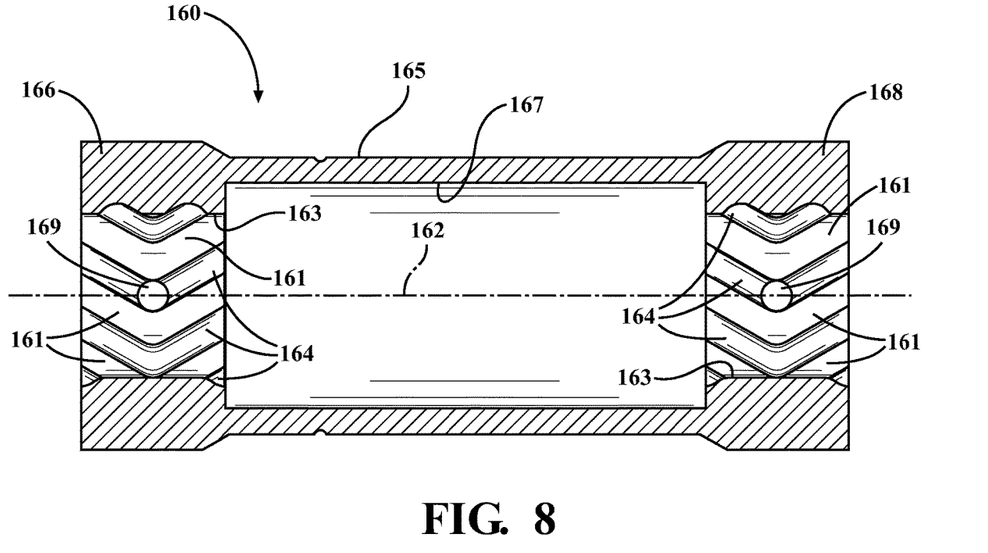
FIG. 8 is a side cross-sectional view of a journal bearing including a uniform herringbone pattern of grooves formed on an inner surface.

Referring to FIG. 8, a journal bearing 160 includes a first end 166, and a second end 168 opposed to the first end 166. A longitudinal axis 162 extends between the first end 166 and the second end 168. The journal bearing 180 includes a radially-extending oil flow bore 169 that is axially centered within each inner bearing portion 163 of the inner surface 167. The oil flow bores 169 permit lubricating oil to flow from an outer surface 165 to the inner bearing portion 163. The inner bearing portion 163 of the journal bearing 180 includes a series of grooves 164 in a herringbone pattern. In particular, each groove 164 is V shaped, is of uniform width and depth, and has the same width and depth as the adjacent groove 164. The grooves 164 are equally spaced about the circumference of the inner bearing portion 163, whereby lands 161 are provided between the grooves 164. One of the grooves 164 intersects the oil flow bore 169.

Figure 9:
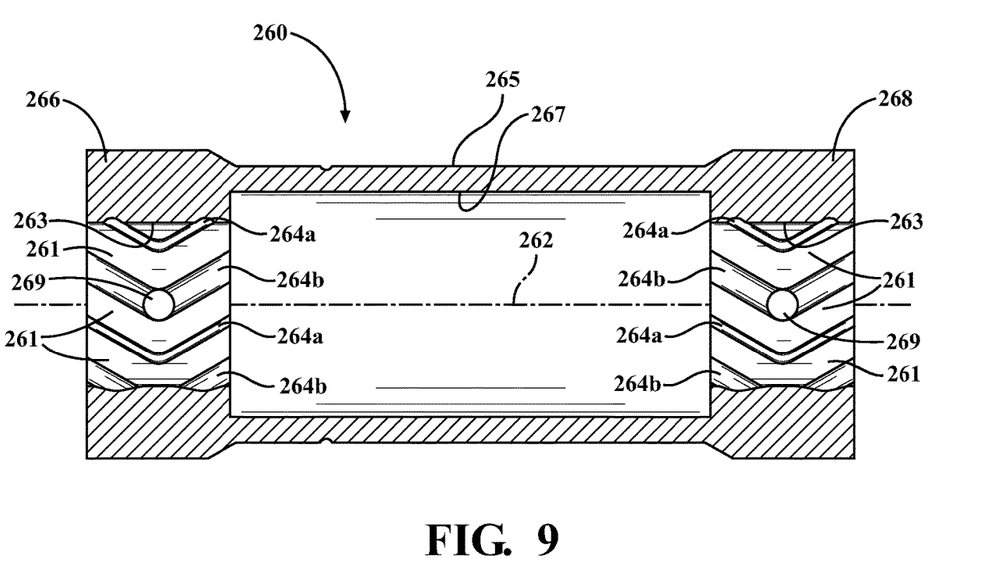
FIG. 9 is a side cross-sectional view of a journal bearing including a non-uniform herringbone pattern of grooves formed on an inner surface.

Referring to FIG. 9, another journal bearing 260 includes a first end 266, and a second end 268 opposed to the first end 266. A longitudinal axis 262 extends between the first end 266 and the second end 268. The journal bearing 260 includes a radially-extending oil flow bore 269 that is axially centered within each inner bearing portion 263 of the inner surface 267. The oil flow bores 269 permit lubricating oil to flow from an outer surface 265 to the inner bearing portion 263. The inner bearing portion 263 of the journal bearing 260 includes a series of grooves 264 in a herringbone pattern. Each groove 264 is V shaped, and is of uniform depth. However, in this embodiment, the width of the grooves is varied. For example, a first groove 264a has a first width, and the adjacent groove 264b has a second width that is greater than the first width. The grooves 264 may have alternating widths (as shown), or have progressively increasing (or decreasing) widths. The grooves 264 are equally spaced about the circumference of the inner bearing portion 263, whereby lands 261 are provided between the grooves 264. One of the grooves 264 intersects the oil flow bore 269. It is contemplated that the depth dimension and/or groove spacing can be varied rather than, or in addition to, varying the width dimension. In addition the lands 261 may be omitted.

Figure 10:
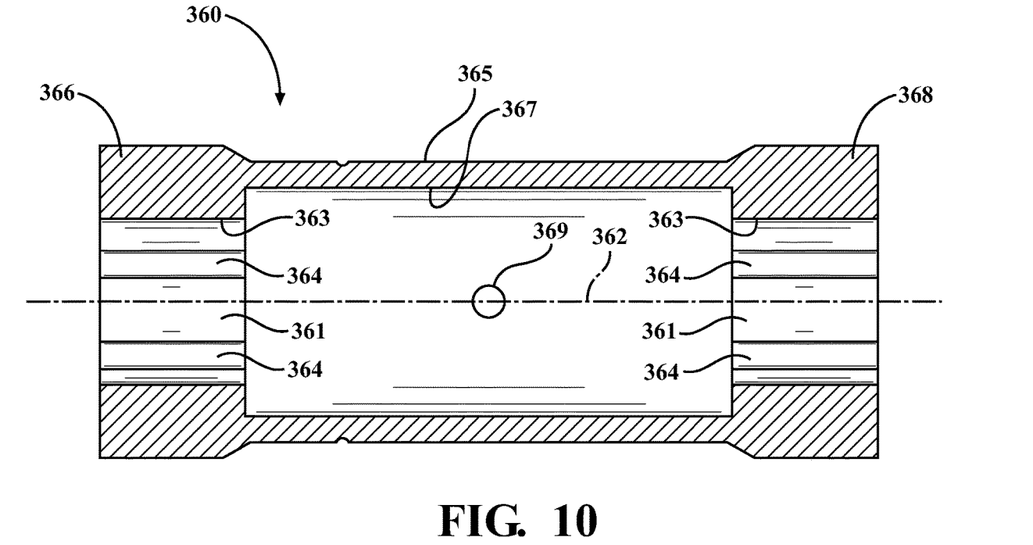
FIG. 10 is a side cross-sectional view of a journal bearing including axially-extending grooves formed on an inner surface.

Referring to FIG. 10, another journal bearing 360 includes a first end 366, and a second end 368 opposed to the first end 366. A longitudinal axis 362 extends between the first end 366 and the second end 368. The journal bearing 360 includes an axially-centered oil flow bore 369 that permits lubricating oil to flow from an outer surface 365 to an inner surface 367. The inner bearing portion 363 of the inner surface 367 of the journal bearing 360 includes a series of grooves 364 that extend axially. In the illustrated embodiment, adjacent grooves 364 have the same width and depth, and are equally spaced apart from each other about the circumference of the inner surface 367 whereby lands 361 are provided between the grooves 164. In other embodiments, adjacent grooves 364 are not equally spaced apart from each other about the circumference, or the lands 361 may be omitted. The axially-extending grooves 364 force the rotor to operate at a higher eccentricity, thus lowering whirl frequency. In addition, the axially-extending grooves 364 aid oil flow within the bearing 360.

Figure 11:
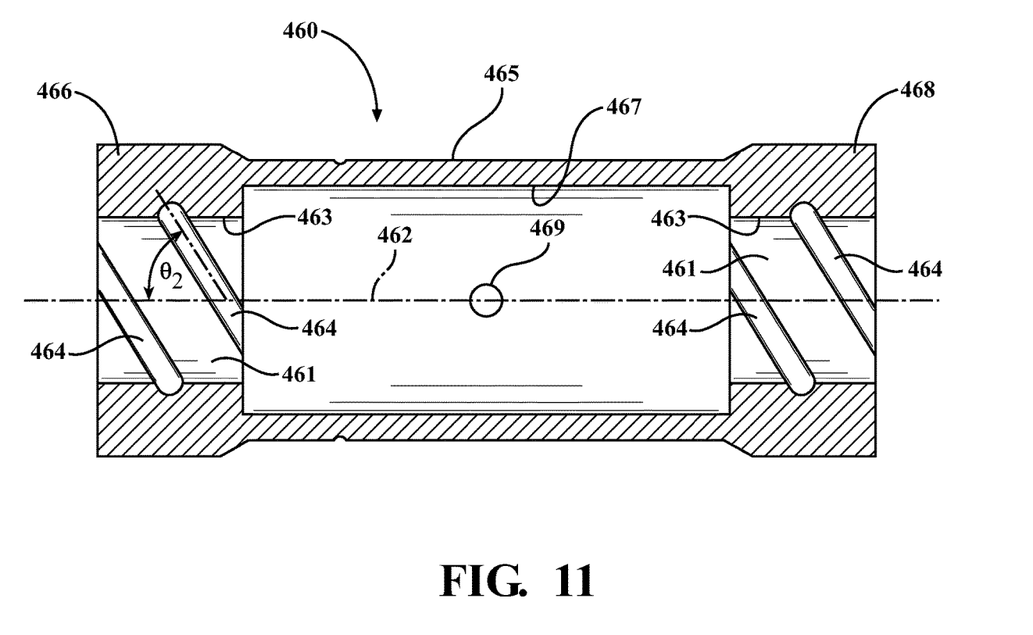
FIG. 11 is a side cross-sectional view of a journal bearing including angled grooves formed on an inner surface.

Referring to FIG. 11, another journal bearing 460 includes a first end 466, and a second end 468 opposed to the first end 466. A longitudinal axis 462 extends between the first end 466 and the second end 468. The journal bearing 460 includes an axially-centered oil flow bore 469 that permits lubricating oil to flow from an outer surface 465 to an inner surface 467. The inner bearing portion 463 of the inner surface 467 of the journal bearing 460 includes a series of grooves 464 that extend between the first end 466 and the second end 468 at an angle θ2 relative to the bearing longitudinal axis 462. In the illustrated embodiment, the angle θ2 is a positive, acute angle for a bearing rotation that is counterclockwise when viewed from the bearing second end 468. The adjacent grooves 464 are equally spaced apart from each other about the circumference of the inner surface 467, whereby lands 461 are defined between the grooves 464. In other embodiments, adjacent grooves 464 are not equally spaced apart from each other about the circumference or the lands 416 may be omitted. The angled grooves 464 reduce oil whirl speed and aid oil flow within the bearing 460.

Figure 12:
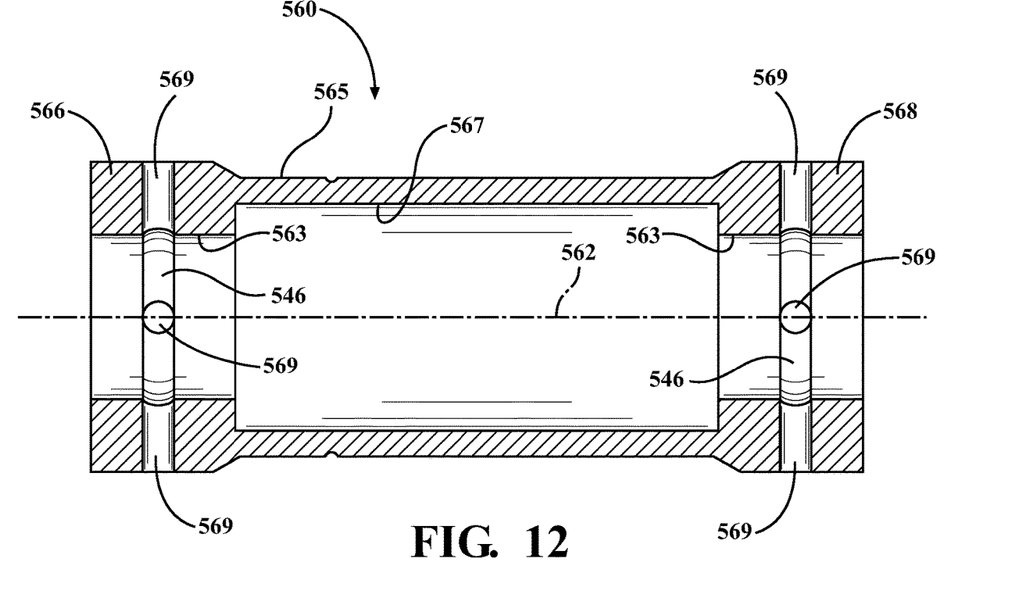
FIG. 12 is a side cross-sectional view of a journal bearing including a single circumferential groove formed on an inner surface.

Referring to FIG. 12, another journal bearing 560 includes a first end 566, and a second end 568 opposed to the first end 566. A longitudinal axis 562 extends between the first end 566 and the second end 568. An inner surface 567 of the journal bearing 560 defines a bearing portion 563 adjacent each of the first and second ends 566, 568. Each inner bearing portion 563 of the inner surface 567 includes multiple radially-extending oil flow bores 569 that are axially centered within the inner bearing portion 563. The oil flow bores 569 permit lubricating oil to flow from an outer surface 565 to the inner bearing portion 563. For each bearing portion 563, the inner surface 567 of the journal bearing 560 includes a single groove 546 that extends circumferentially and intersects each bore 569. The groove 546 serves as a relief groove, whose shorter effective length results in higher eccentricity. The groove 546 may have a uniform width, or a non-uniform width, depending on the requirements of the specific application.

Figure 13:
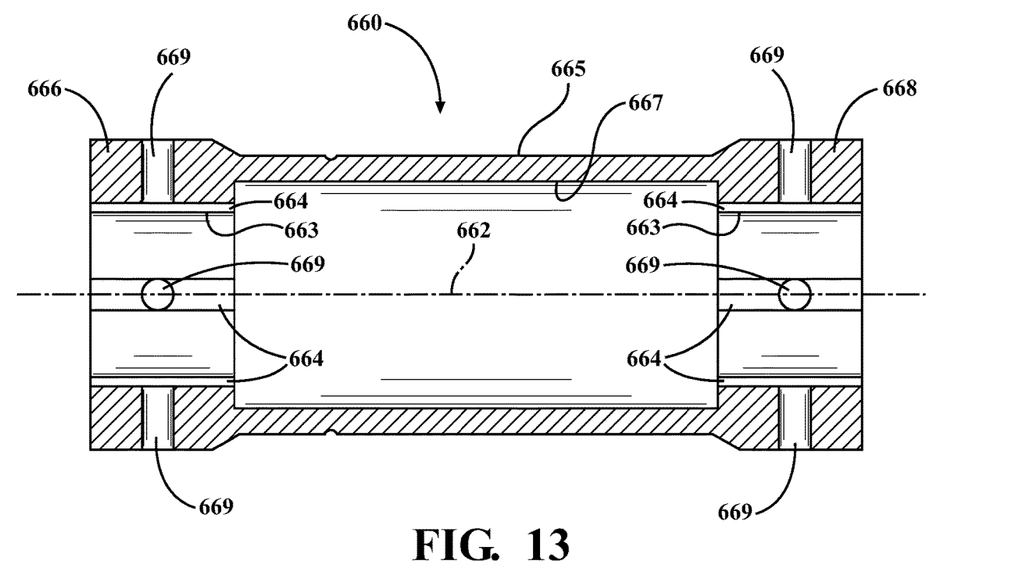
FIG. 13 is a side cross-sectional view of another journal bearing including axially extending grooves formed on an inner surface.

Referring to FIG. 13, another journal bearing 660 includes a first end 666, and a second end 668 opposed to the first end 666. A longitudinal axis 662 extends between the first end 666 and the second end 668. The journal bearing 660 includes multiple radially-extending oil flow bores 669 that are axially centered within each inner bearing portion 663 of the inner surface 667. The oil flow bores 669 permit lubricating oil to flow from an outer surface 665 to the inner bearing portion 663. The inner bearing portion 663 of the inner surface 667 includes a series of grooves 664 that extend axially, and each groove 664 intersects a single bore 669. Like the journal bearing 360 described above with respect to FIG. 10, the axially-extending grooves 664 force the rotor to operate at a higher eccentricity, thus lowering whirl frequency. In addition, the axially-extending grooves 664 aid oil flow within the bearing 660.

Figure 14:
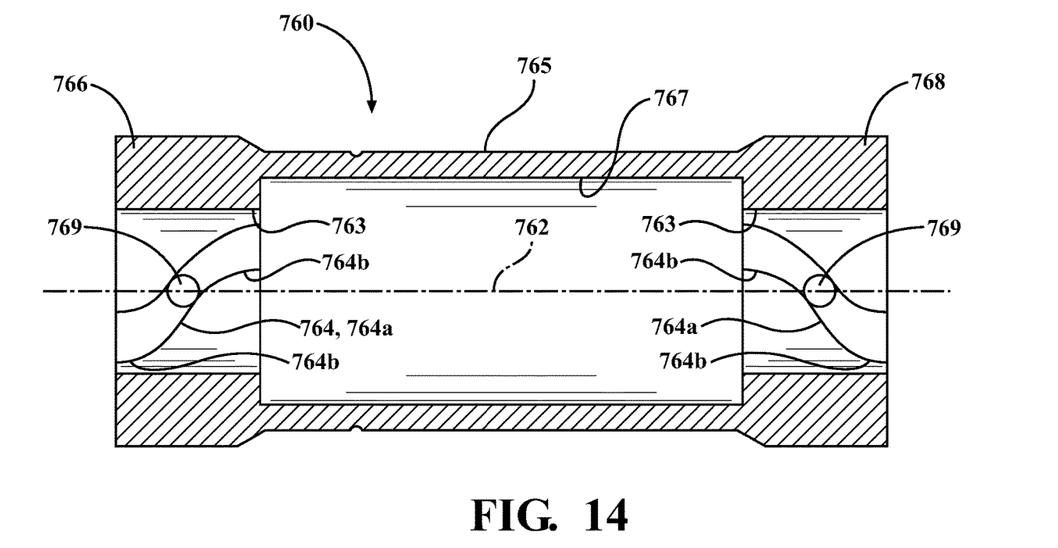
FIG. 14 is a side cross-sectional view of a journal bearing including a spiral groove of non-uniform width formed on an inner surface.

Referring to FIG. 14, another journal bearing 760 includes a first end 766, and a second end 768 opposed to the first end 766. A longitudinal axis 762 extends between the first end 766 and the second end 768. The journal bearing 760 includes a radially-extending oil flow bore 769 that is axially centered within each inner bearing portion 763 of the inner surface 767. The oil flow bores 769 permit lubricating oil to flow from an outer surface 765 to the inner bearing portion 763. The inner bearing portion 763 of the inner surface 767 includes a tapered spiral groove 764. The groove 764 intersects the oil flow bore 769. The width of the groove 764 is relatively narrow in the vicinity 764a of the oil flow bore 769 compared to a width of the groove at locations 764b spaced apart from the oil flow bore 769, for example at the intersection with the first and second ends 766, 768. The relatively wide groove width adjacent the first and second ends 766, 768 provides increased oil flow, which may be required in some applications to provide increased bearing cooling.

Figure 15:
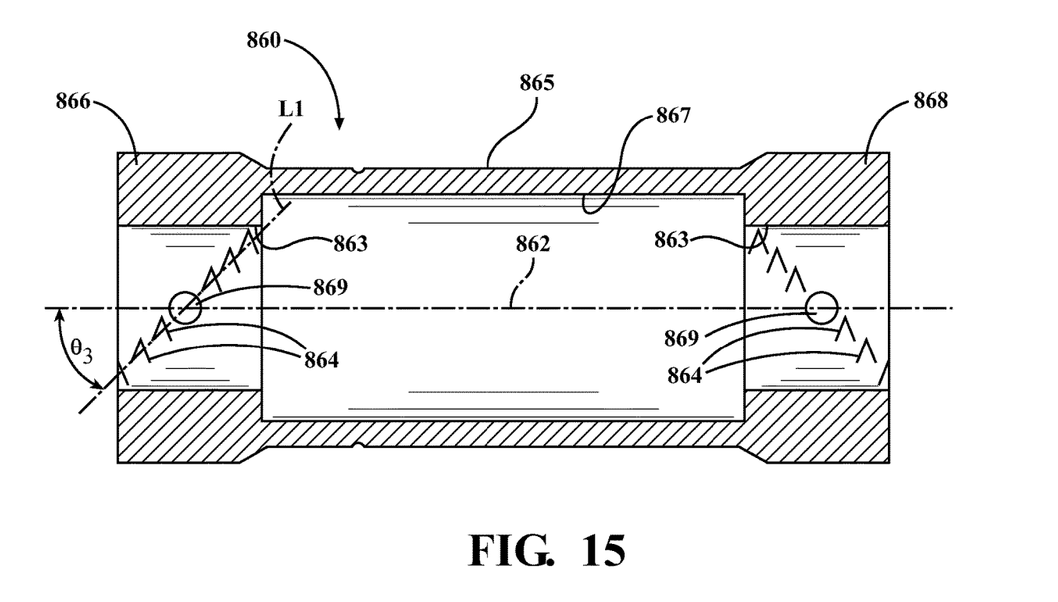
FIG. 15 is a side cross-sectional view of a journal bearing including a fish scale pattern formed on an inner surface.
Figure 16:
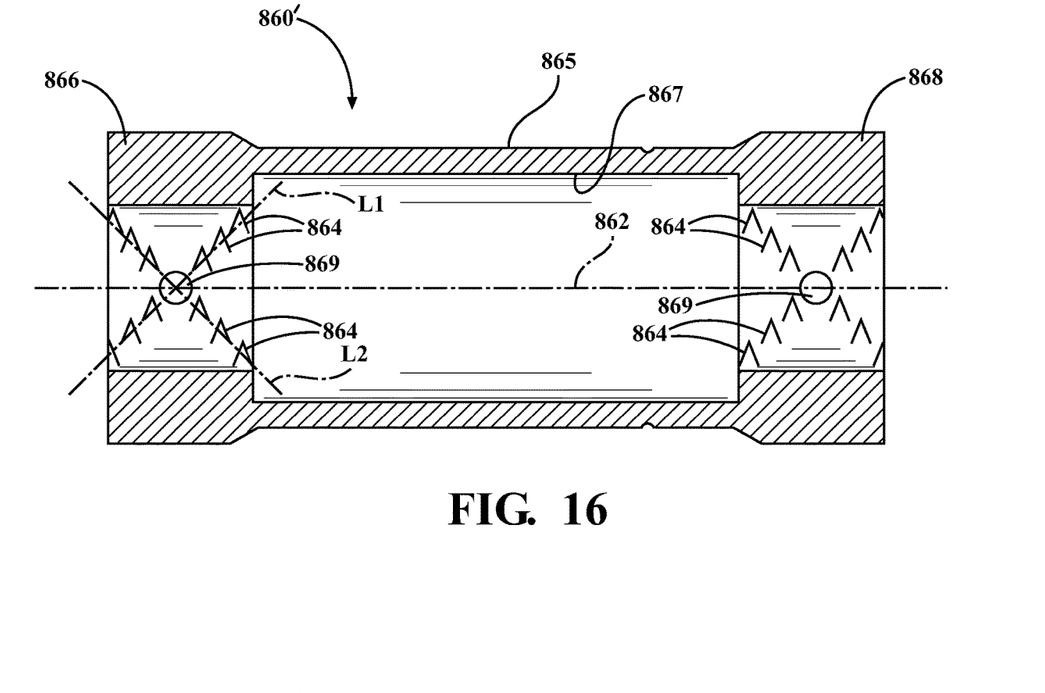
FIG. 16 is a side cross-sectional view of a journal bearing including another fish scale pattern formed on an inner surface.
Figure 17:
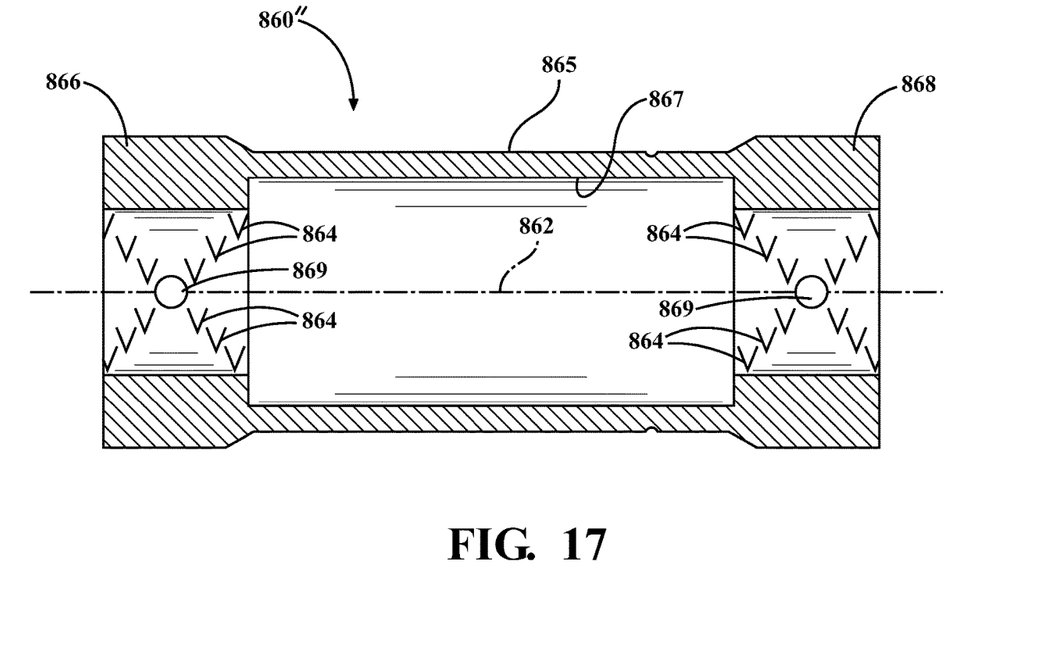
FIG. 17 is a side cross-sectional view of a journal bearing including another fish scale pattern formed on an inner surface.

Referring to FIGS. 15-17, another journal bearing 860 includes a first end 866, and a second end 868 opposed to the first end 866. A longitudinal axis 862 extends between the first end 866 and the second end 868. The journal bearing 860 includes a radially-extending oil flow bore 869 that is axially centered within each inner bearing portion 863 of the inner surface 867. The oil flow bores 869 permit lubricating oil to flow from an outer surface 865 to the inner bearing portion 863. The inner bearing portion 863 of the inner surface 867 includes a "fish scale" pattern. The fish scale pattern includes an ordered arrangement of chevron-shaped recesses 864. For example, the recesses 864 are arranged along a line L1 that is at an angle $\theta_3$ relative to the bearing longitudinal axis 862. In addition, the chevron-shaped recesses 864 are oriented such that the apex of the chevron points circumferentially in the direction of bearing rotation (FIG. 15). The line L1 intersects the bore 869. The fish scale pattern is a "semi-continuous" groove pattern since the individual recesses 864 are non-intersecting but positioned in sufficiently close proximity to approximate a continuous groove. The fish scale pattern is configured to disturb formation of oil whirl, thus reducing subsynchronous vibrations. In addition, the recess shape also helps the lubricating oil to flow out more quickly towards each axial end 866, 868. To provide increased reduction of whirl, the chevron-shaped recesses 864 can be arranged along multiple lines L1, L2 that are angled relative to the bearing longitudinal axis 862, where the lines L1, L2 are intersecting, for example, at a location corresponding to the bore 869 (FIG. 16). Again, the chevron-shaped recesses 864 can be oriented such that the apex of the chevron points in the direction of rotation. To provide still further increased reduction of whirl, the chevron-shaped recesses 864 can be oriented such that the apex of the chevron points circumferentially in a direction opposite the direction of bearing rotation (FIG. 17).

Figure 18:
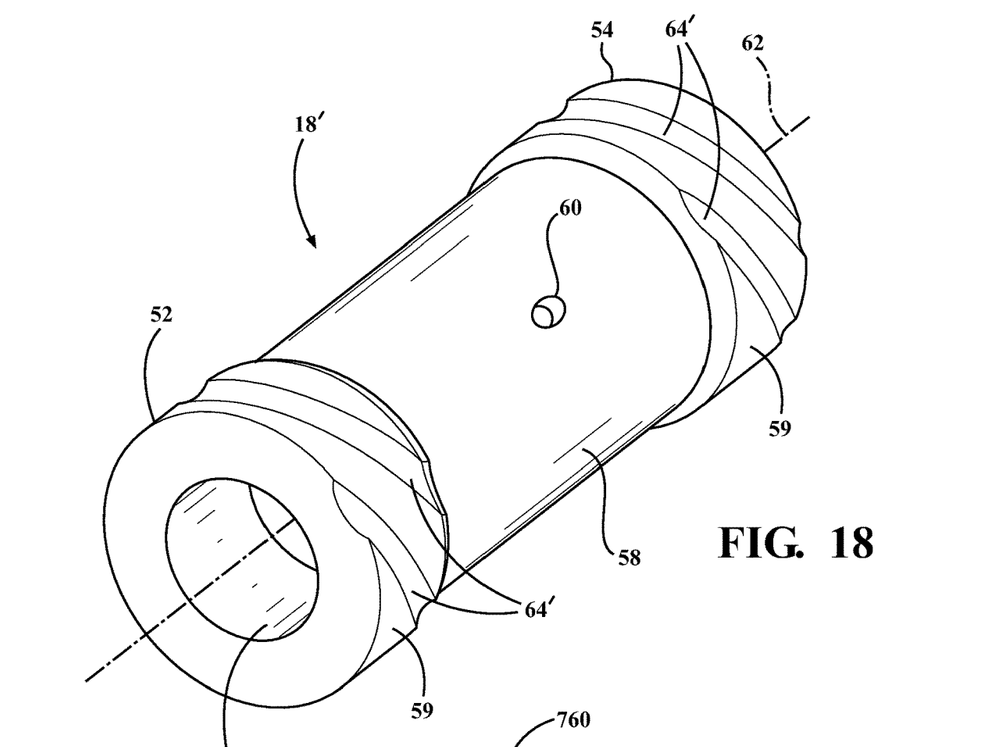
FIG. 18 is a perspective view of a journal bearing including grooves formed on an outer surface.

Referring to FIG. 18, the bearings 18, 20 described above have included grooves 64 formed on an inner surface 56 thereof. It is contemplated that grooves 64' may be provided on the bearing outer surface 58 in addition to, or as an alternative to, the grooves 64 formed on the inner surface. For example, in some embodiments, the grooves 64' are formed on the outer bearing portion 59 of the bearing outer surface 58. The laser cutting device 100, 200 can be used to remove material from the bearing outer surface 58 to a precise width and depth, and in any pattern, including, but not limited to, the angled groove 64' illustrated in FIG. 18.

The laser cutting device 100, 200 described above provides groove patterns having a depth of 0.0254 mm, consistent with some laser etching processes. However, the laser cutting device is not limited to this depth, and may provide groove patterns having a depth of 0.50 mm, which is consistent with some laser engraving processes, or more, depending on the requirements of the specific application.

The laser cutting device 100, 200 described above provides groove patterns in which the groove is a shallow curve having edges 64a, 64a that are rounded or smoothed to reduce turbulence in the vicinity of the groove. However, the groove shape is not limited to this, and may be formed having a rectilinear or other shape, depending on the requirements of the specific application.

Figure 19:
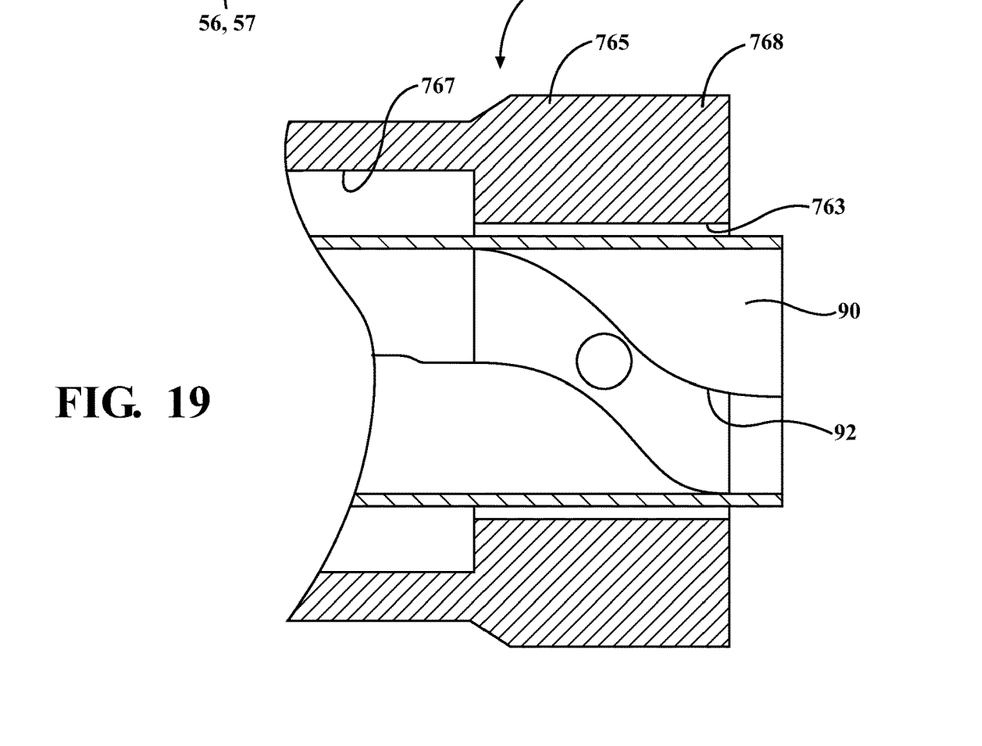
FIG. 19 is a side cross-sectional view of a portion of a journal bearing including a sleeve disposed within the journal bearing.

Referring to FIG. 19, the laser cutting device 100, 200 described above includes a vacuum source 182 and a vacuum line 184 that are configured to remove the vaporized material during cutting, and prevent the vaporized material from coating the bearing surfaces 56, 57, 58, 59. In addition to, or as an alternative to, including the vacuum source 182 and vacuum line 184, the laser cutting device 100, 200 may further include a sleeve 90 that is received coaxially within the journal bearing 18, 760. The sleeve 90 includes a cutout 92 having the profile of the groove 64, 764 to be formed on an inner surface of the bearing 18, 760, and is placed inside the bearing 18, 760 prior to laser cutting. The sleeve 90 serves to prevent the vaporized material from depositing on the bearing surfaces. In the exemplary embodiment of FIG. 19, the cutout 92 has the profile of the tapered spiral groove 764 described above with respect to FIG. 14, but is not limited to this profile. In particular, the cutout 92 can be any shape and dimension, and has a profile that is selected to correspond to the shape and dimension of the groove to be cut on the bearing surface. Moreover, the sleeve 90 is not limited to being used internally, and can be employed externally to protect external bearing surfaces for cases where a groove is formed on an external surface.

The exhaust gas turbocharger 1 includes floating ring bearings which employ an inner oil film and an outer oil film to reduce noise (i.e., unbalance whistle and constant tone induced by rotor unbalance and inner oil whirl in the bearing) and rotor amplitude at resonant frequencies. The illustrated embodiments include semi-floating ring bearings 18, 20 which include a bearing ring that does not rotate. The turbocharger 1 is not limited to this type of floating ring bearing, and can, for example, employ rotating floating ring bearings which include a rotating bearing ring. The grooves can be formed on the inner surface of the rotating floating ring bearings. The turbocharger 1 may also include other types of journal bearings, including, but not limited to, three lobe and lemon bore bearings.

Although the etched bearings have been described herein with respect to supporting a rotating shaft in a turbocharger, the etched bearings described herein are not limited to this application. For example, the etched bearings could be employed to support rotating shafts in other applications found within passenger and commercial vehicles, and in applications outside the automotive field, such as, but not limited to, marine, military, agriculture, aerospace, power generation, heating and cooling, recreational equipment, etcetera.

Similarly, although the laser cutting device has been described herein with respect to machining a surface of bearing, the laser cutting device is not limited to this application, and can be used to remove material from the surfaces of other metal and non-metal objects.

Selected illustrative embodiments of the invention are described above in some detail. It should be understood that only structures considered necessary for clarifying the present invention have been described herein. Other conventional structures, and those of ancillary and auxiliary components of the system, are assumed to be known and understood by those skilled in the art. Moreover, while working examples of the laser cutting device and bearings produced using the same have been described above, the laser cutting device and bearings produced using the same are not limited to the working examples described above, but various design alterations may be carried out without departing from the present invention as set forth in the claims.

What is claimed, is:

1. A laser cutting device configured to etch a surface of a work product, the laser cutting device comprising
   a laser;
   a beam directing tool that is configured to be inserted inside the work product and to receive a beam of electromagnetic radiation emitted from the laser and selectively change the direction of travel of the beam;
   a fixture configured to support the work product in a desired position relative to the beam directing tool;
   an actuator connected to one of the beam directing tool and the fixture, the actuator configured to provide relative movement between the beam directing tool and the fixture;
   wherein the beam directing tool includes
   a tube having a first end, a second end opposed to the first end, and a tube longitudinal axis;
   a mirror supported on the tube such that the mirror is at an angle to the tube longitudinal axis;
   wherein the beam directing tool includes
   a drive shaft disposed within the tube and extending in parallel with the tube longitudinal axis; and
   a gear set that connects the mirror to the drive shaft and is configured to transmit rotation of the drive shaft into a rotation of the mirror.

2. The device of claim 1, wherein the beam directing tool includes an opening disposed between the first end and the second end, and the mirror is fixed within the tube at an axial location corresponding to the opening.

3. The device of claim 1, wherein the mirror is rotatably supported on the second end of the tube via a pin.

4. The device of claim 1, further comprising a vacuum source and a vacuum line extending between the vacuum source and the work product, the vacuum source and the vacuum line configured to remove cutting byproducts from the work product.

5. The device of claim 1, further comprising a cooling fluid source and a fluid line extending between the cooling fluid source and the work product, the cooling fluid source and the fluid line configured to provide a cooling fluid to the work product.

6. The device of claim 1, wherein the position of the fixture is fixed, and the beam directing tool is connected to the actuator, which is configured to vary the position of the beam directing tool relative to the fixture.

7. The device of claim 1, wherein the position of the beam directing tool is fixed, and the fixture is connected to the actuator, which is configured to vary the position of the fixture relative to the beam directing tool.

8. A laser cutting device as set forth in claim 1, further comprising a control wherein the work product comprises a turbocharger journal bearing, and wherein the controller is configured to control the actuator so that so that the laser cuts a helical groove in an inner surface of the turbocharger journal bearing to alter inner oil whirl in the turbocharger journal bearing.

9. A laser cutting device configured to etch a surface of a work product, the laser cutting device comprising
   a laser;
   a beam directing tool that is configured to be inserted inside the work product and to receive a beam of electromagnetic radiation emitted from the laser and selectively change the direction of travel of the beam;
   a fixture configured to support the work product in a desired position relative to the beam directing tool;
   an actuator connected to one of the beam directing tool and the fixture, the actuator configured to provide relative movement between the beam directing tool and the fixture,
   a controller configured to control the actuator, and control the intensity and duration of the beam output from the laser, wherein the work product comprises a turbocharger journal bearing, and wherein the controller is configured to control the actuator so that the laser cuts a helical groove in an inner surface of the turbocharger journal bearing to alter inner oil whirl in the turbocharger journal bearing.

10. A laser cutting device configured to etch a surface of a work product, the laser cutting device comprising
    a laser;
    a beam directing tool that is configured to be inserted inside the work product and to receive a beam of electromagnetic radiation emitted from the laser and selectively change the direction of travel of the beam;
    a fixture configured to support the work product in a desired position relative to the beam directing tool;
    an actuator connected to one of the beam directing tool and the fixture, the actuator configured to provide relative movement between the beam directing tool and the fixture,
    a controller configured to control the actuator, and control the intensity and duration of the beam output from the laser, wherein the beam directing tool includes
    a tube having a first end, a second end opposed to the first end, and a tube longitudinal axis;
    a mirror supported on the tube such that the mirror is at an angle to the tube longitudinal axis;
    wherein the beam directing tool includes
    a drive shaft disposed within the tube and extending in parallel with the tube longitudinal axis; and
    a gear set that connects the mirror to the drive shaft and is configured to transmit rotation of the drive shaft into a rotation of the mirror.

* * * * *